United States Patent

Heyman et al.

[15] 3,706,845
[45] Dec. 19, 1972

[54] METHOD OF IMPROVING THE γ OF A CATHODOCHROMIC DISPLAY DEVICE

[72] Inventors: Philip Michael Heyman, Trenton; Istvan Gorog, Princeton, both of N.J.

[73] Assignee: RCA Corporation

[22] Filed: Oct. 8, 1970

[21] Appl. No.: 79,037

[52] U.S. Cl. ......178/7.5 D, 178/DIG. 31, 350/160 R
[51] Int. Cl..................................................G02f 1/28
[58] Field of Search.... 178/5.4 R, 5.4 BD, 7.87, DIG. 31, 178/7.5 D; 313/91; 350/160 R, 160 P

[56] References Cited

UNITED STATES PATENTS

| | | |
|---|---|---|
| 3,438,022 | 4/1969 | Teeg et al.....................178/DIG. 31 |
| 3,253,497 | 5/1966 | Dreyer...................................313/91 |
| 3,148,281 | 9/1964 | Fyler......................................313/91 |
| 2,836,753 | 5/1958 | Hodowanel...........................313/91 |

*Primary Examiner*—Robert L. Richardson
*Assistant Examiner*—George G. Stellar
*Attorney*—Glenn H. Bruestle

[57] ABSTRACT

Operation of a cathodochromic display tube by steps including destabilizing the color centers for the optically reversible coloration component of the cathodochromic material. Such destabilizing excludes at least partially the optically reversible coloration components before the image-formation process.

Destabilization can be achieved by heating the cathodochromic material to a temperature at least equal to the partial erase temperature but below the total erase temperature of the cathodochromic material, and/or by exposing the cathodochromic material material to radiation of suitable wavelength.

8 Claims, 3 Drawing Figures

PATENTED DEC 19 1972

3,706,845

INVENTORS.
Istvan Gorog and
Philip M. Heyman
BY Leon Nirghosian
ATTORNEY

METHOD OF IMPROVING THE γ OF A CATHODOCHROMIC DISPLAY DEVICE

STATEMENT

The invention described herein was made in the performance of work under a NASA contract and is subject to the provisions of Section 305 of the National Aeronautics and Space Act of 1958, Public Law 85–586 (72 Stat. 435; 42 U.S.C. 2457).

BACKGROUND OF THE INVENTION

The present invention relates to an improved method of operating a cathodochromic display tube.

In the operation of cathodochromic display tubes, which are known in the art, an image is produced (written) on a layer of cathodochromic material included in the screen thereof by causing electrons to impinge on the cathodochromic layer, thereby producing optically active centers (i.e., F-centers or color-centers) in the layer. An image thus produced in the cathodochromic layer manifests itself as colored areas in a suitable ambient light, such an image exhibiting different ambient light-reflective properties than those areas (which are substantially not colored) of the cathodochromic layer that are not impinged upon by electrons, as is known in the art.

In the operation of such cathodochromic tubes in the prior art, it is relatively difficult to achieve faithful reproduction of the input signal where higher contrast images are desired because of the following reason. The total coloration (i.e., the color of a written image) imparted to the layer of cathodochromic material comprises, in most cases, two coloration components. One such coloration component is substantially optically reversible (i.e., that component can be erased, or eliminated, by exposure to suitable radiation), whereas the other such coloration component is substantially optically irreversible but can be eliminated by subjecting the cathodochromic material to an elevated temperature (i.e., it is thermally reversible), the latter such coloration component being relatively immune to thermal erasure at about room temperature. The optically reversible coloration component can also be erased by heating the cathodochromic material.

Referring to FIG. 1, where the contrast ratio of a colored area produced in a cathodochromic material by electron impingement thereon, is plotted against electron beam exposure of such cathodochromic material, it can be seen that, for beam exposures up to about 10 $\mu$ coulombs/in$^2$, the optically-reversible coloration component (curve A) is more sensitive (i.e., there is a greater amount of change in the contrast ratio per unit change of electron exposure) than is the optically irreversible coloration component (curve B), the total coloration (indicated as curve C) of the cathodochromic material being derivable from these two components. The greater sensitivity of the optically reversible coloration component provides a relatively large increase in the contrast ratio for relatively small increases in the electron beam exposure of the cathodochromic layer, until the centers giving rise to the optically reversible coloration (such centers being familiar to the art) are substantially occupied by electrons (as seen from the maximum level reached by curve A in FIG. 1). For the material to which FIG. 1 specifically pertains (i.e., sodalite containing bromine) a total contrast ratio of about 1.5:1 (curve C) can be achieved with the comparatively low electron beam exposure of about 3 $\mu$ coul/in$^2$. This contrast ratio of about 1.5:1 is largely due to the optically reversible component (curve A). In contrast thereto, an electron beam exposure of about 20 $\mu$ coul/in$^2$ is needed to attain a total contrast ratio of about 2:1 (curve C), such a contrast ratio of about 2:1 being provided by the sum of the optically reversible coloration component and the optically irreversible component. As a result, in the operation of a display device comprising a cathodochromic material exhibiting the above type of behavior, there is, during the initial stages of exposure of the cathodochromic layer to an electron beam, generally a rapid initial increase in total contrast ratio and a slower subsequent increase therein as the electron beam exposure of the cathodochromic layer is increased to higher levels. This can be demonstrated in a plot of contrast ratio against electron beam exposure, both on linear scales. For this reason, the reproduction faithfulness (or "fidelity") of the image that is produced, varies with the electron beam exposure of the cathodochromic layer of the display device, greater changes in contrast ratio of the produced image occurring at lower levels of electron exposure and smaller, disproportionate changes in in contrast ratio occurring at higher levels of electron exposure (i.e., for longer electron exposure times), as seen from FIG. 1. The variation in the fidelity of the produced image can be overcome to some extent by adjusting the circuitry associated with the display tube in the case where the display device has a γ that is substantially constant, γ being defined herein as the slope of the curve of log contrast ratio versus log electron beam exposure, as shown in FIG. 2. Such an adjustment, which constitutes a γ-correction, is a difficult, if not an impossible, task in a large number of cases because the inherent characteristics of many cathodochromic materials preclude a constant γ value over the range of contrast ratios that is generally of interest in a commercial device (i.e., generally, up to a contrast ratio of about 6:1). Instead, the value of γ varies for different contrast ratios so that the fidelity of the image that is produced also varies.

SUMMARY OF THE INVENTION

The present invention comprises a method of operating a cathodochromic display tube by steps comprising destabilizing at least a substantial portion, and preferably all, of the color centers of the optically reversible coloration component of the cathodochromic material and then writing information on the cathodochromic material by electron impingement thereon while at least some of the color centers are in an unstable state. Such destabilization excludes the optically reversible coloration component, either in part or in full, as the case may be, depending on the quantity of the color centers that are destabilized.

Such destabilization can be achieved by exposing the cathodochromic material to radiation whose wavelength is suitable for erasing the optically reversible coloration component of the cathodochromic material, or by heating such material to a suitable temperature below the total erase temperature, but at least equal to the partial erase temperature of the cathodochromic material. Heating can be achieved by an infra-red radiation means or by means of an electrical resistance heater (e.g., a thin metal film that is part of the screen of the display tube) that is in heat transfer relationship with the cathodochromic material.

Among its advantages, the present invention allows the attainment of significantly improved image fidelity, with desirable contrast ratios.

DESCRIPTION OF THE PREFERRED EMBODIMENT

Figure 3:
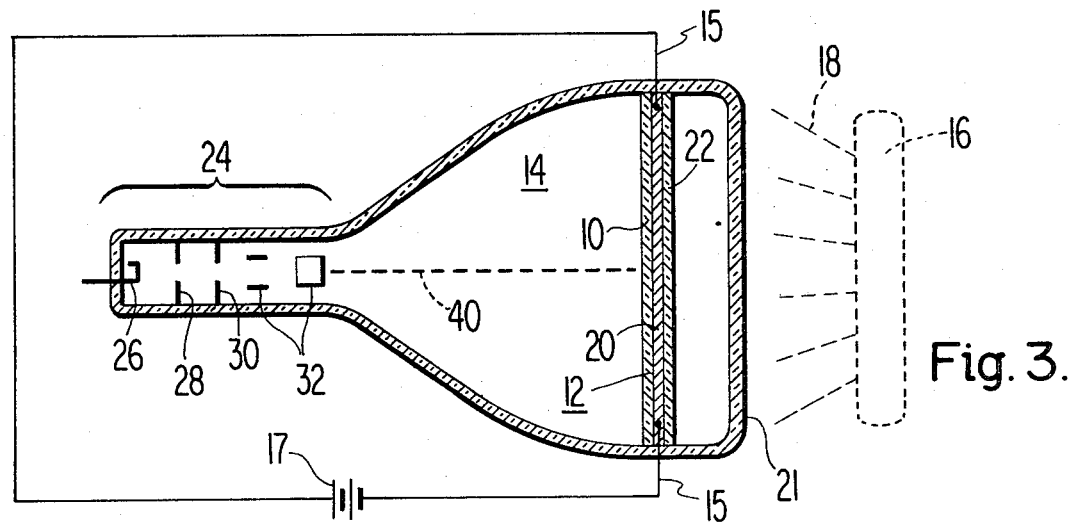
FIG. 3 is an axial sectional elevation view schematically illustrating a cathodochromic display tube with which the present invention can be practiced.

In the operation of a cathodochromic display tube (e.g., that shown in FIG. 3, which tube has a layer 10 of cathodochromic material) according to the present invention, an improvement in the fidelity of the image produced therein is achieved by "excluding" at least a portion of the optically reversible coloration component of the cathodochromic material at about the beginning of the information-writing process. Such exclusion of this component can be accomplished by destabilizing at least a portion, and preferably all, of the optically reversible color centers (known in the art), the destabilization of all of these centers leading to complete exclusion of the optically reversible coloration component and the destabilization of less than all of these centers leading to partial exclusion of the optically reversible component. Such destabilization can be accomplished by heating the cathodochromic material to a temperature at which substantially all of the optically reversible coloration component is erasable, such a temperature generally being below the "total erase temperature" (discussed below) but at least equal to the "partial erase temperature" (which is defined herein as that temperature at which the number of electrons captured by optically reversible color centers equals or is less than the rate of decay of these color centers). Substantially no coloration is provided by the optically reversible component while the cathodochromic material is maintained in the partial erase temperature range, it being preferred that the cathodochromic material be so maintained until the initial stages of the information-writing operation. The partial erase temperature range for most sodalite materials extends from about 100° to about 150°C. The quantity of optically reversible centers that are destabilized, and therefore the amount of decrease in the optically reversible coloration component, increases with temperature, substantially complete destabilization occurring at the partial erase temperature.

It is obvious that substantially no writing (i.e., image formation) on the cathodochromic material will take place if the temperature of the cathodochromic material exceeds that temperature (referred to as the "total erase temperature") at which substantially all coloration (color-centers in the cathodochromic material including both the optically reversible and irreversible coloration components) are erasable. Such total erase temperatures for various cathodochromic materials are familiar to the art, the total erase temperature for many sodalite-type materials generally being above 200°C. The cathodochromic material is subjected to the total erase temperature where it is desired to erase information written thereon.

It is preferred that the optically reversible component have been excluded (preferably, substantially completely) at the beginning of the information-writing operation. In one embodiment, where destabilization is achieved by heating the cathodochromic material, such heating is discontinued at about the time that the information-writing operation is begun. In this embodiment, because the heating process is discontinued approximately when writing is begun, the cathodochromic material is able to cool toward the ambient temperature as the writing operation is carried out. When the temperature of the cathodochromic material is below the abovementioned partial erase temperature (at which the optically reversible coloration component is erasable), some of the destabilized color centers become stable and this optically reversible coloration component is present and contributes to the total coloration of the image that is produced. As the cathodochromic material cools to temperatures further below the partial erase temperature, more optically reversible color centers become stable and the contribution of the optically reversible component to total coloration gradually increases (as the writing operation is continued) with decreasing temperature, thereby providing somewhat improved contrast ratios over the contrast ratios that are available with only the thermally irreversible coloration component. This process can be called restabilization of the destabilized color centers.

Figure 2:
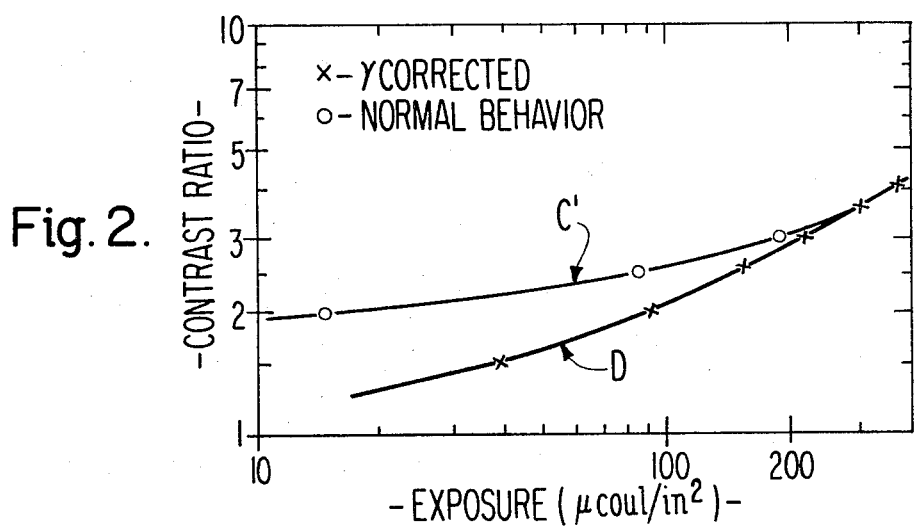
FIG. 2 is a general plot of log image contrast ratio against log electron beam exposure, each of the two curves individually indicating total coloration for a respective one of two operating conditions of a cathodochromic display device, one condition being with $\gamma$ correction and the other, without $\gamma$ correction.
Figure 1:
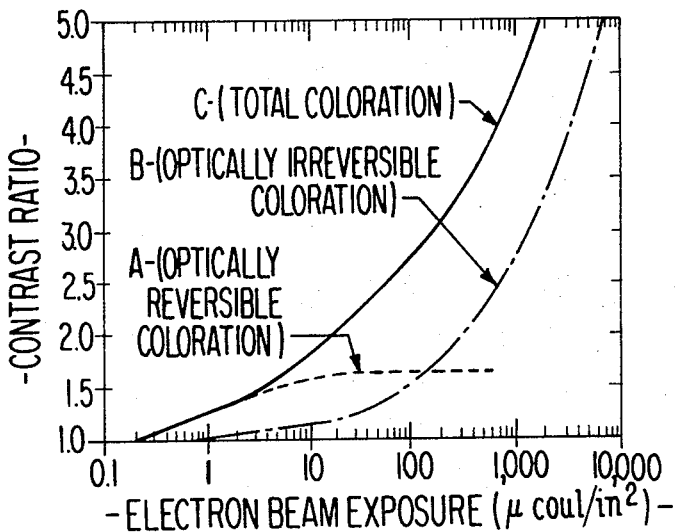
FIG. 1 is a general plot of the image contrast ratio that can be attained for various electron beam exposures of cathodochromic material, the total coloration of the image having optically reversible and irreversible components.

As seen from FIG. 2, the total contrast ratio of the image producible with an uncorrected $\gamma$ (Curve C', which corresponds with Curve C in FIG. 1) initially rises quickly to a contrast ratio value of about 2-to 1 after a comparatively short electron beam exposure (about 20 $\mu$ coul./in²). As the electron beam exposure continues to higher levels, the total contrast ratio (Curve C') of the image that is produced increases by an amount that is, in comparison with the initial increase, disproportionate to the increase in electron beam exposure, thus giving rise to the abovementioned problem with image fidelity.

The image total contrast ratio obtainable by operation of a cathodochromic display tube according to the present invention is plotted in Curve D (FIG. 2) as a function of electron beam exposure of the display tube's cathodochromic layer. It can be seen that the $\gamma$ value (Curve D) of a cathodochromic display tube operated according to the present invention is significantly more constant (in comparison with the $\gamma$ value, in Curve C', obtainable without $\gamma$ correction) over a relatively broad range of electron beam exposures. In the operation of a cathodochromic display tube according to the present invention so as to achieve an improved γ the relatively large initial rise in contrast ratio for comparatively short electron beam exposures that occurs in the operation of a cathodochromic tube without γ-correction, is substantially absent.

Alternatively, the optically reversible coloration component can be excluded (i.e., the color centers thereof are destabilized) by exposing the cathodochromic material of the display tube to radiation having a wavelength that is suitable for erasing the optically reversible coloration component of such cathodochromic material. Such radiation can be provided, for example, by a lamp of a type familiar to the art. The erasing radiation for sodalite-type materials generally has a wavelength of about 5,550 angstrom units. In the operation of the cathodochromic display tube by this alternative method, the radiation intensity level is adjusted such that at least a portion, and preferably substantially all, of the optically reversible coloration component is excluded, such intensity level being maintained until the initial stages of the information-writing operation, at which time the projection of such radiation on the cathodochromic material is terminated. In an alternative embodiment the intensity of such radiation is adjusted, as the writing operation progresses, to lower levels, where less of the optically reversible coloration component is excluded, thereby allowing some of the destabilized optically reversible color centers to achieve a substantially stable state. In this manner, the optically reversible coloration component is brought into operation, preferably in a gradual manner, and contributes (with the optically irreversible coloration component) to the total coloration of the image that is produced, as described above. Such adjustment of the radiation can be done by reducing the intensity of the radiation as the writing operation progresses.

The cathodochromic layer 10 (FIG. 3) of the screen 12 of a display tube 14 can be heated in any one of a number of ways to carry out the present invention. For instance, the heating can be accomplished by the electron (writing) beam and/or supplemental heating means, such supplemental means including an infra-red source (internal or external to the tube) that projects such radiation on the screen (an external infra-red source 16 and the infra-red radiation 18 emitted therefrom being shown in dotted line in FIG. 3) or an electrical resistance heater in the form of a electrically conducting layer 20 (FIG. 3) at the screen 12, such a layer 20 being, for example, a transparent thin coating of metal located between the layer 10 of cathodochromic material and a transparent substrate 22 (e.g., glass) that acts as the supporting member of the screen 12. Alternatively, the conducting layer 20 can be a transparent electrically conducting material, such as indium oxide or tin oxide located between the transparent substrate 22 and the cathodochromic layer 10. Where a significant quantity of heat is generated in the cathodochromic material by the electron beam that impinges thereon, the abovementioned heating means (i.e., electrical resistance heater, etc.) can be used to supplement the electron beam. In FIG. 3 the cathodocrhromic-screen display tube 14 includes means 15 for electrically connecting a source 17 of electrical potential to the conducting layer 20 of the screen 12, a transparent faceplate 21, and an electron gun 24. The electron gun may include a cathode 26, a control electrode 28, an accelerating electrode 30, and electrostatic deflection electrodes 32, according to known practices.

The present invention allows the attainment of significantly improved image fidelity, with desirable contrast ratios.

We claim:

1. A method of operating a display device including a screen comprising a layer of a cathodochromic material, said cathodochromic material being colorable by electron impingement thereon, the coloration comprising two coloration components, a first one of said components comprising optically reversible centers and a second one thereof comprising optically irreversible centers, said method comprising:
   a. destabilizing at least a portion of said optically reversible coloration centers;
   b. then writing information on said cathodochromic material while at least some of said color centers are in the destabilized state; and
   c. during said writing step, and independently of the means used to perform said writing, improving the linearity of response achievable by said writing step by gradually restabilizing increasing numbers of said destabilized centers, whereby the coloration contribution from said optically reversible component gradually increases during said writing step.

2. The method defined in claim 1, wherein said destabilizing of said color centers is achieved by heating said cathodochromic material to an elevated temperature at least equal to the partial erase temperature thereof but below the total erase temperature of said cathodochromic material,
   whereby substantially all coloration contribution from said optically reversible coloration component is excluded at the start of said writing step.

3. The method defined in claim 2, wherein said cathodochromic material is sodalite and said partial erase temperature is about 100° to 150°C. and said total erase temperature is about 200°C.

4. The method defined in claim 2, wherein said cathodochromic material is cooled below said partial erase temperature during said writing,
   whereby some of said destabilized color centers achieve a substantially stable state.

5. The method defined in claim 1, wherein said destabilization of said portion of said color centers is achieved by directing radiation of suitable wavelength onto said cathodochromic material.

6. The method defined in claim 5, wherein said cathodochromic material is sodalite and said destabilization is attained by exposing said sodalite to radiation having a wavelength of about 5,550 A.

7. The method defined in claim 1 wherein said destabilizing step comprises heating said cathodochromic material to the total erase temperature thereof, and wherein said restabilizing step comprises cooling said material down from said total erase temperature.

8. A method of operating a display device including a screen comprising a layer of cathodochromic material, said cathodochromic material being colorable by electron impingement thereon, the coloration comprising two coloration components, a first one of said components being optically reversible and a second one thereof being optically irreversible, said method comprising:
  a. destabilizing at least a portion of the color centers of said optically reversible coloration component by directing radiation of suitable wavelength onto said cathodochromic material, said radiant energy having a certain intensity level;
  b. writing information on said cathodochromic material; and
  c. improving the linearity of response achievable by said writing step by lowering said intensity of said radiation during said writing,
whereby certain ones of said destabilized color centers achieve a substantially stable state during said writing.

* * * * *